(12) United States Patent
Li

(10) Patent No.: US 12,105,512 B2
(45) Date of Patent: Oct. 1, 2024

(54) METHOD FOR PREVENTING ROBOT FROM COLLIDING WITH CHARGING BASE

(71) Applicant: AMICRO SEMICONDUCTOR CO., LTD., Guangdong (CN)

(72) Inventor: Yongyong Li, Guangdong (CN)

(73) Assignee: AMICRO SEMICONDUCTOR CO., LTD., Guangdong (CN)

( * ) Notice: Subject to any disclaimer, the term of this patent is extended or adjusted under 35 U.S.C. 154(b) by 231 days.

(21) Appl. No.: 17/642,242

(22) PCT Filed: Aug. 21, 2020

(86) PCT No.: PCT/CN2020/110624
§ 371 (c)(1),
(2) Date: Mar. 11, 2022

(87) PCT Pub. No.: WO2021/047378
PCT Pub. Date: Mar. 18, 2021

(65) Prior Publication Data
US 2022/0317689 A1 Oct. 6, 2022

(30) Foreign Application Priority Data
Sep. 11, 2019 (CN) .......................... 201910860744.3

(51) Int. Cl.
*G05D 1/00* (2024.01)
*A47L 11/40* (2006.01)

(52) U.S. Cl.
CPC ........ *G05D 1/0214* (2013.01); *A47L 11/4061* (2013.01); *A47L 2201/04* (2013.01); *G05D 1/0225* (2013.01)

(58) Field of Classification Search
CPC .. G05D 1/0214; G05D 1/0225; G05D 1/0276; G05D 1/0242; A47L 2201/02;
(Continued)

(56) References Cited

U.S. PATENT DOCUMENTS

2008/0007203 A1* 1/2008 Cohen ................... G01S 1/7034
320/104
2013/0098401 A1* 4/2013 Yoon ................... A47L 11/4066
15/21.1
(Continued)

FOREIGN PATENT DOCUMENTS

CN      106054889 A    10/2016
CN      106406299 A    2/2017
(Continued)

OTHER PUBLICATIONS

The extended European search report of the corresponding EP patent application No. 20863663.9, mail date Sep. 28, 2022.

*Primary Examiner* — Joan T Goodbody
*Assistant Examiner* — Michael Lukon
(74) *Attorney, Agent, or Firm* — Samson G. Yu

(57) ABSTRACT

A method for preventing a robot from colliding with a charging base, including: step 1, during a process of moving in a current working area of the robot, detecting, in real time, a reception condition of a base avoidance signal of the robot within a received signal coverage range thereof; and step 2, establishing a safety area in the current working area according to a direction feature relationship between the base avoidance signal and a preset working path of the robot, and before establishing the safety area, according to an orientation relationship between the base avoidance signal and a direction of a current moving path of the robot, marking and establishing a danger area at a position that satisfies a collision avoidance relationship with a current position of the robot, so that the robot avoids the charging base during the process of moving in the current working area.

8 Claims, 4 Drawing Sheets

(58) Field of Classification Search
CPC ............... A47L 2201/04; A47L 9/2852; A47L 11/4011; A47L 11/4061; B60L 2260/32; B60L 3/0015; B60L 53/36; B60L 53/37; B60L 53/67; H02J 7/0029
See application file for complete search history.

(56) References Cited

U.S. PATENT DOCUMENTS

2013/0166134 A1   6/2013  Shitamoto et al.
2018/0014709 A1*  1/2018  O'Brien ................ A47L 9/2884

FOREIGN PATENT DOCUMENTS

| | | | | |
|---|---|---|---|---|
| CN | 107340768 | A | 11/2017 | |
| CN | 108445879 | A | 8/2018 | |
| CN | 108507578 | A * | 9/2018 | ........... G01C 21/206 |
| CN | 108908331 | A | 11/2018 | |
| CN | 108983246 | A | 12/2018 | |
| CN | 109240312 | A | 1/2019 | |
| CN | 109270933 | A | 1/2019 | |
| CN | 109407675 | A | 3/2019 | |
| CN | 109464075 | A | 3/2019 | |
| CN | 109602341 | A | 4/2019 | |
| CN | 109933072 | A | 6/2019 | |
| CN | 110609550 | A | 12/2019 | |
| EP | 1921523 | A2 | 5/2008 | |
| JP | 3478149 | B2 | 12/2003 | |
| JP | 2007520012 | A | 7/2007 | |
| WO | 2015072002 | A1 | 5/2015 | |

* cited by examiner

METHOD FOR PREVENTING ROBOT FROM COLLIDING WITH CHARGING BASE

CROSS-REFERENCE TO RELATED APPLICATION

The present disclosure claims the priority of Chinese Patent Application No. 201910860744.3, filed to the China National Intellectual Property Administration on Sep. 11, 2019 and entitled "Method for Preventing Robot from Colliding with Charging Base", which is incorporated herein its entirety by reference.

TECHNICAL FIELD

The disclosure relates to the control field of collision avoidance and base avoidance of robots, and in particular to a method for preventing a robot from colliding with a charging base.

BACKGROUND

At present, floor mopping robots on the market generally have an automatic function to return to charging bases, and most of the charging bases use infrared signals to guide the robots to return to the charging bases. In order to ensure that the robots will not collide with the charging bases during a sweeping process, the robots generally avoid the charging bases by receiving signals sent by the charging bases. However, most base avoidance signals of the charging bases are infrared signals, and the infrared signals are affected by many factors. In this way, when the robots approach to the charging bases from an oblique direction, due to limited distances between the robots and the charging bases and the instability of infrared guidance signals to return to the charging bases, the robots are far from the charging bases sometimes and are close to the charging bases sometimes, such that the robots cannot effectively avoid the charging bases according to infrared base avoidance signals. As a result, the robots often collide with the charging bases, thus affecting the working efficiency of the robots.

SUMMARY

The technical solution of the disclosure proposes a method for preventing a robot from colliding with a charging base. The specific technical solution is as follows:

A method for preventing a robot from colliding with a charging base, including: step 1, during a process of moving in a current working area of the robot, a reception condition of a base avoidance signal of the robot within a received signal coverage range thereof is detected in real time, and the base avoidance signal is from the charging base that is specifically used for charging the robot; and step 2, a safety area is established in the current working area according to a direction feature relationship between the base avoidance signal received by the robot and a preset working path of the robot, and before establishing the safety area, according to an orientation relationship between the base avoidance signal received by the robot and a direction of a current moving path of the robot, a danger area is marked and established at a position that satisfies a collision avoidance relationship with a current position of the robot, so that the robot avoids the charging base during the process of moving in the current working area.

Further, before establishing the safety area, when the robot detects the base avoidance signal directly in front of it, a danger identification position is marked at a first preset position that is one body radius of the robot away from the current position of the robot in a current moving direction of the robot, and meanwhile, in a direction perpendicular to the current moving direction of the robot, the danger identification positions is marked at a second preset position and a third preset position, which are adjacent to the first preset position, so that the first preset position, the second preset position and third preset position which are adjacent to the first preset position all conform to the collision avoidance relationship with the current position of the robot; and then, the robot is controlled to stop moving forward, to retreat for a segment of preset safety distance in a direction opposite to the current moving direction, then to rotate in situ so as to continue to move along a path that has been passed through.

Further, in the step 2, when the robot only detects the base avoidance signal on a left side of a moving direction of itself, and detects that the preset working path extends toward a right side of the direction of the current moving path of the robot, a straight line where the current moving path of the robot is located or a body center line of the robot is determined as a boundary, and a right side area of the boundary is set as the safety area.

Further, in the step 2, when the robot only detects the base avoidance signal on a right side of a moving direction of itself, and detects that the preset working path extends toward a left side of the direction of the current moving path of the robot, a straight line where the current moving path of the robot is located or a body center line of the robot is determined as a boundary, and a left side area of the boundary is set as the safety area.

On the basis of the foregoing technical solution, before establishing the safety area, when the robot only detects the base avoidance signal on the left side of the moving direction of itself, in a direction of deflecting leftward for a preset angle relative to the current moving direction, a danger identification position is marked at a position that is one body diameter of the robot away from the current position of the robot, so that the identification position and the current position of the robot conform to the collision avoidance relationship; and then, the robot is controlled to stop moving forward, to retreat for a segment of preset safety distance in the direction opposite to the current moving direction, then to rotate in situ so as to move along a direction opposite to the preset working path.

On the basis of the foregoing technical solution, before establishing the safety area, when the robot only detects the base avoidance signal on the right side of the moving direction of itself, in a direction of deflecting rightward for a preset angle relative to the current moving direction, a danger identification position is marked at a position that is one body diameter of the robot away from the current position of the robot, so that the identification position and the current position of the robot conform to the collision avoidance relationship; and then, the robot is controlled to stop moving forward, to retreat for a segment of preset safety distance in the direction opposite to the current moving direction, then to rotate in situ so as to move along a direction opposite to the preset working path.

Further, the method further includes: when the safety area is determined, in the safety area, with the current position of the robot as a starting point, a collision avoidance sensitive area whose length and width are both a preset sensitive distance is established according to a working direction of the preset working path, and the preset sensitive distance is less than or equal to a distance covered by the base avoidance signal, and an extension direction of a node on a boundary of the collision avoidance sensitive area relative to the starting point is taken as the working condition; and when the robot steps out of the current collision avoidance sensitive area along the preset working path, the safety area currently established is deleted, and then, with a real-time position of the robot as the starting point, the step 2 is repeated to establish the safety area which is next, and before establishing the safety area which is next, the danger area is established by marking danger identification positions at the position that satisfies the collision avoidance relationship with the current position of the robot.

Further, the danger identification positions are mapped into a grid map, and then the identification positions are connected together to synchronously establish the danger area in the grid map, so as to surround the charging base, and the grid map is established by marking position information in real time during the process of moving in the current working area by the robot.

Further, the preset angle is between 30 and 60 degrees.

Further, the method further includes: after establishing the danger area in the grid map for a first time, the robot is controlled to move to a non-safety area in the current working area; and when the base avoidance signal is detected, whether a duration of the base avoidance signal reaches a preset response time is determined, if the duration of the base avoidance signal reaches the preset response time, the step 2 is repeated to establish the danger area which is next, and if the duration of the base avoidance signal doesn't reach the preset response time, the base avoidance signal which is currently detected is not used to establish the danger area, and the preset response time is at a millisecond level.

DETAILED DESCRIPTION OF THE EMBODIMENTS

Figure 1:
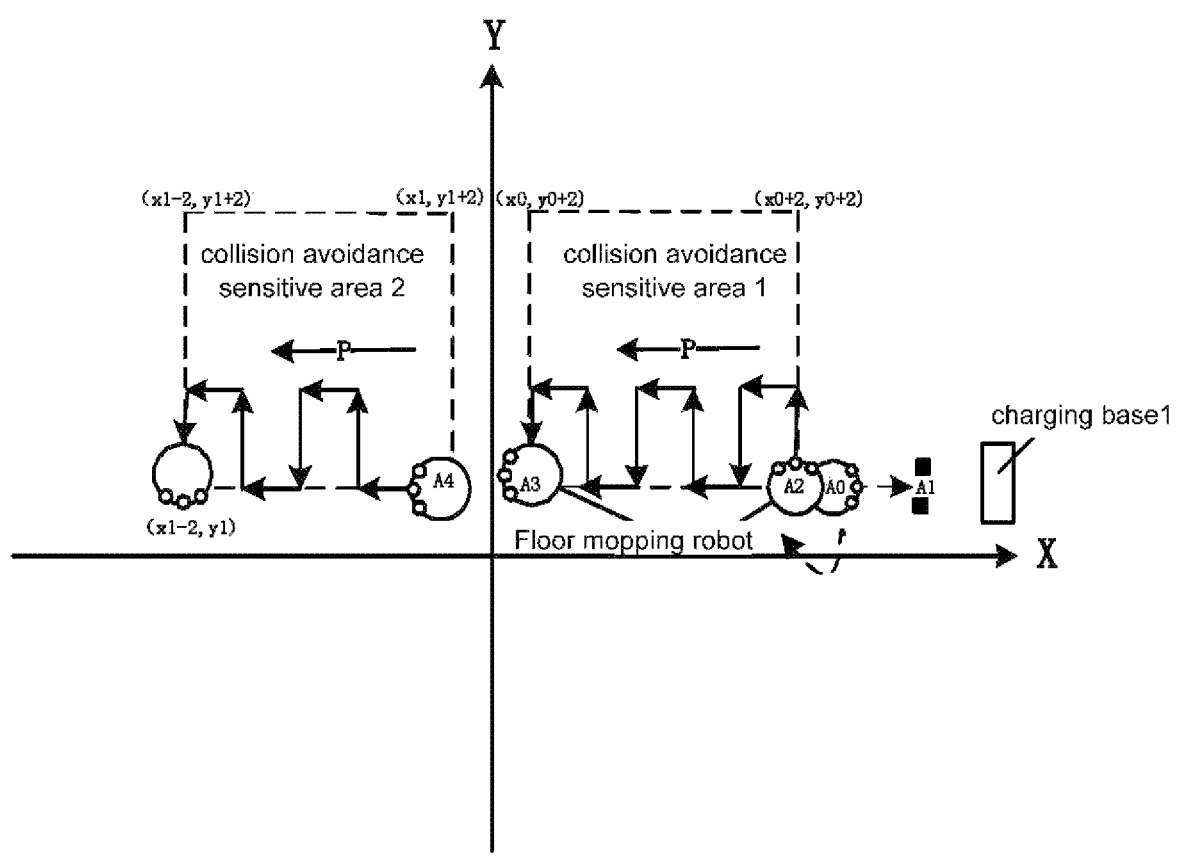
FIG. 1 is a process schematic diagram of establishing a safety area and marking a danger identification position in a current moving direction during a movement process of a robot along a currently planned arcuate path in Embodiment 1, in a scene where there is a charging base on a right side of a Y axis.

The above solutions will be further described below in conjunction with specific embodiments. It should be understood that the following embodiments are used for illustrating the disclosure, and are not intended to limit the scope of the disclosure. The implementation conditions utilized in the following embodiments can be further adjusted according to the conditions of specific manufacturers, and the implementation conditions that are not indicated are usually conditions in routine experiments.

An implementation subject of the disclosure is a robot. The robot is installed with infrared receiving sensors in at least three different directions for receiving a base avoidance signal sent by a charging base, that is, an infrared collision avoidance signal. The infrared receiving sensors installed in the three different directions include: a front sensor located directly in front of it, the others are side sensors located on both sides of the front sensor, and an angle of the side sensor deviating from the front sensor is set to be 30-60 degrees. Moreover, the robot provided by the present embodiment includes a floor mopping robot that moves in a planned manner, so that the floor mopping robot can perform sweeping according to a preset direction.

The embodiment of the disclosure provides a method for preventing a robot from colliding with a charging base. An area where there is no charging base is predicted by base avoidance signals of different angles, so as to achieve an effect of preventing the robot from being affected by the base avoidance signals during a sweeping process in the area. The method for preventing the robot from colliding with the charging base includes: step 1, during a process of moving in a current working area of the robot, a reception condition of a base avoidance signal of the robot within a received signal coverage range thereof is detected in real time, and the base avoidance signal is from the charging base that is specifically used for charging the robot; and step 2, a safety area is established in the current working area according to a position feature relationship between the base avoidance signal received by the robot and a preset working path of the robot, that is, according to an angle of the base avoidance signal which is received deviating from a current moving direction of the robot, and a working direction in which a pre-planned working path of the robot extends relative to an initial point, and before establishing the safety area, a danger area is marked and established at a position that satisfies a collision avoidance relationship with a current position of the robot, so that the robot avoids the charging base during the process of moving in the current working area. In the method provided by the present embodiment, an effective working area at the periphery of the charging base is set by establishing the danger area and the safety area, such that the robot moving in the safety area is not interfered by the base avoidance signal and executes the pre-planned working path, and the robot moving in the danger area beyond the safety area effectively avoids the charging base in time. The technical problem that the angle and intensity of the signals received by the robot are unstable is solved, and the working efficiency of the robot is improved.

It should be noted that, after the floor mopping robot starts to call a program for avoiding the charging base, it is determined whether the safety area has been established; and if the safety area has not been established, then the safety area and the danger area are established according to the step 2. If the safety area has been established, it is continuously determined whether the robot has stepped out of the safety area which is currently established along the preset working path, if the robot has stepped out of the safety area which is currently established along the preset working path, the safety area which is currently established is deleted, the danger area is established by marking a danger identification position at the position that satisfies the collision avoidance relationship with the current position of the robot, and then the safety area which is next is established; and when the robot has not stepped out of the safety area which is currently established along the preset working path, the robot continues to move along the preset working path until stepping out of the safety area which is currently established, and the danger identification position is not marked when the robot moves in the safety area. In the present embodiment, danger identification positions are mapped into a grid map, then the identification positions are connected together to synchronously establish the danger area in the grid map, so as to surround the charging base, and the grid map is established by marking position information in real time during the process of moving in the current working area by the robot.

An area range and an establishment time of the safety area are limited in the present embodiment, even if receiving the base avoidance signal and even colliding with the charging base that moves in real time, the robot also continues to work along the preset working path, thereby ensuring that the movement of the robot is not disturbed by the base avoidance signal; and an establishment time state of the danger area is also limited in the present embodiment, only stepping out of the safety area, the safety area which is next can be established by deleting historical information of the safety area which is currently established, and the danger area also needs to be identified before the safety area is established, thereby avoiding the risk of the robot colliding with the charging base more effectively, and reducing the influence of the base avoidance signal.

As Embodiment 1, before the safety area is established, the robot moves to a position A0 along a pre-planned arcuate path that extends toward a positive direction of an X axis, and has already detected, at the position A0, a base avoidance signal transmitted from a charging base 1 directly in front of it. At this time, a transmitting direction of the base avoidance signal received by the robot is the same as the working direction of the preset working path of the robot, so the safety area cannot be established at the position A0.

As shown in FIG. 1, the robot detects, at the position A0, the base avoidance signal transmitted from the charging base 1 directly in front of it, in the current moving direction of the robot, that is, in the positive direction of the X axis of a coordinate system, the danger identification position is marked at a first preset position A1 that is one body radius of the robot away from the current position of the robot, and it can be regarded as a position that occupies a grid area in the grid map and satisfies the collision avoidance relationship; and at the same time, in a direction perpendicular to the current moving direction of the robot (corresponding to the direction in which A0 points to A1 in FIG. 1), a second preset position and a third preset position adjacent to the first preset position, which correspond to two black square areas adjacent to the position A1, are marked as the danger identification positions, which can be regarded as two grids adjacent to a grid A1 in the grid map in a Y axis direction, so that position distribution relationships among the first preset position, the adjacent second preset position and the adjacent third preset position, and the current position of the robot form the collision avoidance relationship, so as to limit the robot to continue to perform the sweeping work along the arcuate path toward the positive direction of the X axis.

Then, the robot stops moving forward, retreats for a segment of preset safety distance to a position A2 in a direction opposite to the current moving direction (corresponding to the direction pointed by an arrow P in FIG. 1), and then rotates in situ, so that a sensor directly in front of it faces the positive direction of the Y axis. As shown in FIG. 1, starting from the position A2, the robot continues to perform the sweeping work along the pre-planned arcuate path. At the same time, before the safety area which is next (including a collision avoidance sensitive area 1 as shown in FIG. 1) is established, the danger area is established by marking the danger identification position at a position that satisfies the collision avoidance relationship with the current position of the robot. The embodiment of marking the danger identification position provided in the present embodiment improves the identification coverage rate of the danger area, and reduces the risk of the robot colliding with the charging base on the front side.

As shown in FIG. 1, when the robot moves to the position A2, when the robot only detects the base avoidance signal on a right side of a moving direction of itself, and detects that the preset working path extends toward a left side of the direction of the current moving path of the robot, as shown in FIG. 1, the robot moves, starting from the position A2, along the positive direction of the Y axis, and performs arcuate sweeping, that is, the preset working path. Since the charging base 1 is on a right side of the position A2, the base avoidance signal received by the robot at the position A2 comes from the charging base 1 on the right side (the positive direction of the X axis) of the position A2. At the same time, in the present embodiment, the arcuate path which is currently planned is set to extend toward the direction indicated by the arrow P on the left side, so that the area covered by the arcuate path is on a left side (the negative direction of the X axis) of the position A2. Then, a straight line where the current moving path of the robot is located or a body center line of the robot is determined to be a boundary, that is, a straight line that passes through the position A2 and is perpendicular to the X axis is determined to be the boundary, then the boundary is recorded in the grid map, thereafter, a left side area of the boundary is set to be the safety area and is recorded, so that the robot is not affected by the base avoidance signal during the process of moving in the safety area. In the present embodiment, a safety area for excluding the charging base is set according to a directional relationship between the base avoidance signal on the right side of the forward direction and the currently planned sweeping working path of the robot, so as to achieve the purpose of preventing the robot from being affected by the base avoidance signal of the charging base 1 during a sweeping process in this area.

Theoretically, the entire left side area of the boundary is the safety area. Considering that the charging base will be moved, or there is a charging base in a further area on the left side, but the base avoidance signal sent by the charging base is not detected, therefore, it is necessary to establish a collision avoidance sensitive area for constraining the effective range of the safety area. A rectangular collision avoidance sensitive area whose length and width are both a preset sensitive distance is set, which can be determined according to the base avoidance signal range of the charging base, and the preset sensitive distance is less than or equal to a distance covered by the base avoidance signal. In the present embodiment, with the current position of the robot as a starting point, and according to the working direction of the preset working path, a collision avoidance sensitive area whose length and width are both the preset sensitive distance is established, and is recorded in the grid map. As shown in FIG. 1, in the present embodiment, a rectangular collision avoidance sensitive area whose length and width are both 2 m is preferably set, and a coordinate unit is set to be m; in a coordinate system corresponding to the grid map, which can be a local grid coordinate system, or a transformed global coordinate system, the coordinate of the current position A2 of the robot are (x0+2, y0), the length and width of the collision avoidance sensitive area are both 2 m, an extension direction of a node on the boundary of the collision avoidance sensitive area relative to the starting point is taken as the working direction, and the direction of the arrow P in FIG. 1 is taken as the working direction in the present embodiment, therefore four boundaries forming the collision avoidance sensitive area 1 in FIG. 1 respectively intersect at (x0+2, y0+2), (x0, y0+2), A3 (x0+2, y0) and A2 (x0, y0). Starting from the position A2 (x0, y0), the robot performs the sweeping work along the arcuate path shown in the figure, and does not process the base avoidance signal received in the collision avoidance sensitive area 1, and always moves to a position A3 (x0, y0) along the arcuate path shown in the figure, then steps out of the collision avoidance sensitive area 1, and moves to a position A4 (x1, y1).

When the robot steps out of the collision avoidance sensitive area 1 along the arcuate path, the collision avoidance sensitive area 1 which is established is deleted from the grid map. At this time, there is no charging base in the surrounding, or the base avoidance signal transmitted by the charging base 1 is not received, so the danger identification position is not marked; and then, with the position A4 (x1, y1) of the robot as the starting point, the working direction is also set to be the direction indicated by the arrow P in FIG. 1, a collision avoidance sensitive area 2 whose length and width are both 2 m is established, and the rectangular collision avoidance sensitive area 2 in FIG. 1 is planned out, and the four boundaries of the collision avoidance sensitive area 2 intersect at (x1−2, y1+2), (x1, y1+2), (x1−2, y1) and A4 (x1, y1). Starting from the position A4 (x1, y1), the robot performs the sweeping work along the arcuate path shown in the figure, and does not process the base avoidance signal received in the collision avoidance sensitive area 2, and always moves to the position (x1−2, y1) along the arcuate path shown in the figure, and then steps out of the collision avoidance sensitive area 2. At the same time, the collision avoidance sensitive area 2 which is established is deleted. If the base avoidance signal transmitted by the charging base is received at the position A4 (x1, y1), before the safety area which is next (including the collision avoidance sensitive area 2) is established, the danger area is established by marking the danger identification position at the position that satisfies the collision avoidance relationship with the current position of the robot.

Figure 2:
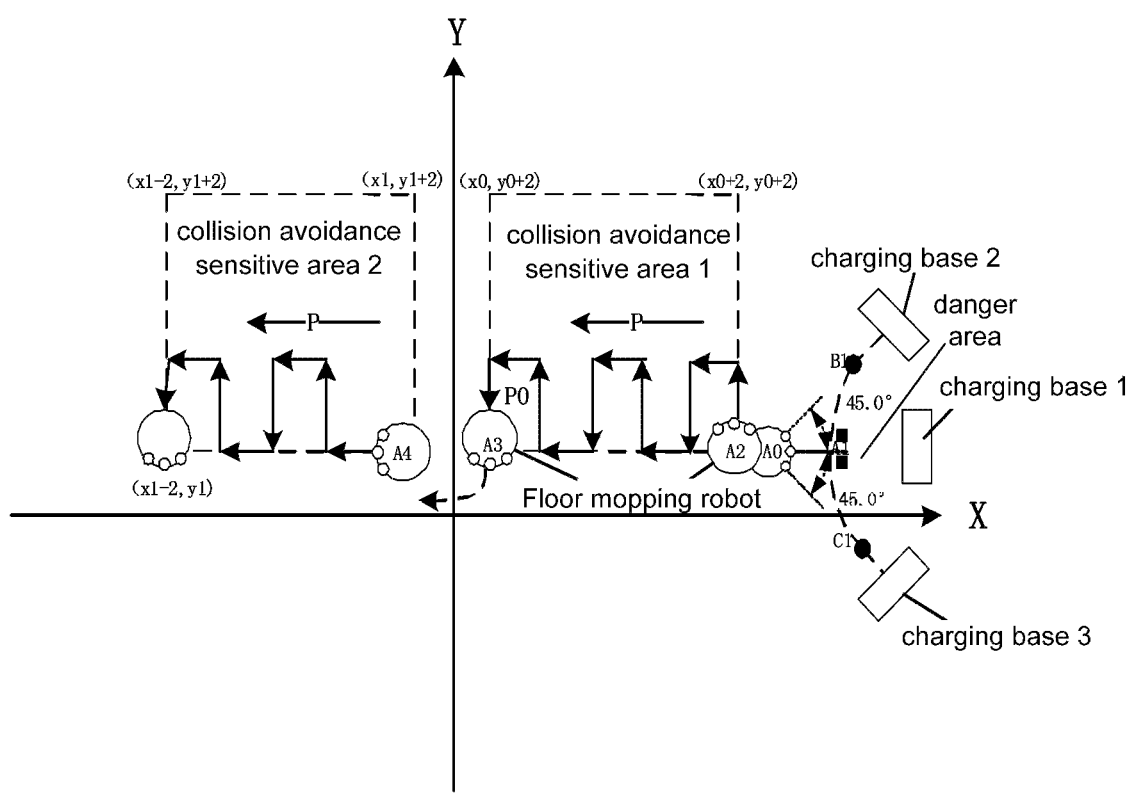
FIG. 2 is a process schematic diagram of establishing a safety area and danger area during a movement process of a robot along a currently planned arcuate path in Embodiment 2, in a scene where there is a charging base on a right side of a Y axis.

As Embodiment 2, it is based on the determination of the danger identification position A1 in Embodiment 1. As shown in FIG. 2, before the safety area is established, the robot detects, at the position A0, the base avoidance signal transmitted from a charging base 3 on the right side of the moving direction of itself, but the situation is not excluded that the base avoidance signals are sent by the charging bases at other positions in the current working area, and the signal intensity of the base avoidance signal is sufficient to be received by a right side sensor of the robot at the position A0; and then, in a direction of deflecting rightward for a preset angle relative to the current moving direction, that is, in a direction of deflecting rightward for 45 degrees relative to the direction in which A0 points to A1 in FIG. 2, the danger identification position is marked at a position C1 that is one body diameter of the robot away from the current position A0 of the robot, so that the danger identification position C1 and the current position A0 of the robot conform to the collision avoidance relationship, which is used for limiting the robot to continue to perform the sweeping work along the arcuate path toward the positive direction of the X axis. The identification accuracy of the danger area is improved, and the risk of the robot colliding with the charging base is reduced.

Before the safety area is established, the robot detects, at the position A0, the base avoidance signal transmitted from a charging base 2 on the left side of the moving direction of itself, but the situation is not excluded that the base avoidance signals are sent by the charging bases at other positions in the current working area, and that the signal intensity of the base avoidance signal is sufficient to be received by a left side sensor of the robot at the position A0; and then, in a direction of deflecting leftward for a preset angle relative to the current moving direction, that is, in a direction of deflecting leftward for 45 degrees relative to the direction in which A0 points to A1 in FIG. 2, the danger identification position is marked at a position B1 that is one body diameter of the robot away from the current position A0 of the robot, so that the identification position B1 and the current position A0 of the robot conform to the collision avoidance relationship, which is used for limiting the robot to continue to perform the sweeping work along the arcuate path toward the positive direction of the X axis. The identification accuracy of the danger area is improved, and the risk of the robot colliding with the charging base is reduced.

After the danger identification positions B1, A1, C1 and the two black square areas adjacent to the position A1 are independently marked and mapped into the grid map one by one, these identification positions are connected together, as shown by arc-shaped dotted lines in the positive direction of the X axis in FIG. 2, and the danger area is established synchronously in the grid map to surround the charging base, so as to predict the position of the charging base in the grid map, and the grid map is established by marking the position information in real time during the process of moving in the current working area by the robot. During the process of moving in the current working area by the robot, these danger areas which are surrounded semi-enclosed are abandoned at first, thereby reducing the risk of the robot colliding with the charging base; and the situation is avoided when the robot enters the danger area, it may repeatedly enter and exit the coverage area of the base avoidance signal and the coverage area of the guidance signals to return to the charging base of the robot, resulting in a decrease in the working efficiency of the robot.

Then, the robot stops moving forward, and retreats for a segment of preset safety distance to the position A2 in a direction opposite to the current moving direction (corresponding to the direction pointed by the arrow P in FIG. 2). As shown in FIG. 2, starting from the position A2, the robot continues to perform the sweeping work along the pre-planned arcuate path. At this time, the robot only detects the base avoidance signal on the right side of the moving direction of itself, and detects that the preset working path extends toward the left side of the direction of the current moving path of the robot. Since there is no distribution of charging bases in the negative direction of the X axis in FIG. 2, which is similar to the coordinate environment feature shown in FIG. 1 corresponding to Embodiment 1, in the present embodiment, the safety area is established in the same position area according to the method in the Embodiment 1, and on the basis of the safety area, the collision avoidance sensitive area 1 and the collision avoidance sensitive area 2 are established in the same position area, as shown in FIG. 2. In the present embodiment, the safety area is limited within an area range, that is, in the collision avoidance sensitive area, even if receiving the base avoidance signal and even colliding with the charging base that moves in real time, the robot also continues to work along the preset working path, thereby ensuring that the movement of the robot is not disturbed by the base avoidance signal; and only stepping out of the collision avoidance sensitive area, the safety area which is next can be established by deleting the historical information of the safety area which is currently established, and the danger area also needs to be identified before the safety area is established, thereby avoiding the risk of the robot colliding with the charging base more effectively. Therefore, the robot is not affected by the base avoidance signal.

Embodiment 3: in the Embodiment 1, the danger identification position A1 and its adjacent danger identification positions have been marked at the position A0, the robot subsequently moves to the position A3 (x0+2, y0) and steps out of the collision avoidance sensitive area 1, and then moves to a position A5 according to the arcuate path shown in FIG. 1. At this time, the robot detects, at the position A5, the base avoidance signal transmitted from a charging base 5 directly in front of it. Before the safety area is established, the robot moves to the position A5 along the pre-planned arcuate path that extends toward the negative direction of the X axis, and has already detected, at the position A5, the base avoidance signal transmitted from the charging base 5 directly in front of it. At this time, the transmitting direction of the base avoidance signal received by the robot is the same as the working direction of the preset working path of the robot, so the safety area cannot be established at the position A5.

Figure 3:
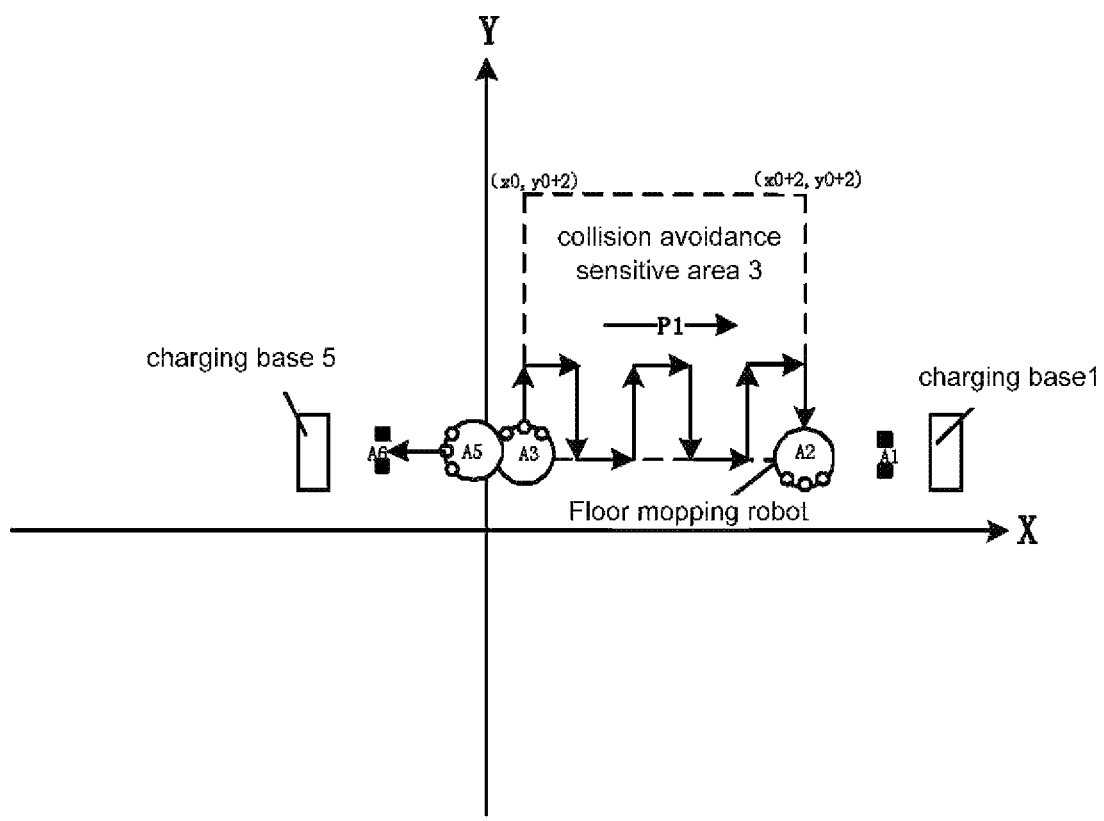
FIG. 3 is a process schematic diagram of establishing a safety area and marking a danger identification position in a current moving direction during a movement process of a robot along a currently planned arcuate path in Embodiment 3, in a scene where there are charging bases on both a right side and a left side of a Y axis.

As shown in FIG. 3, in the current moving direction of the robot, that is, in the negative direction of the X axis of the coordinate system, the danger identification position is marked at a first preset position A6 that is one body radius of the robot away from the current position of the robot, and it can be regarded as occupying a grid area in the grid map; and at the same time, in a direction perpendicular to the current moving direction of the robot (corresponding to the direction in which A5 points to A6 in FIG. 3), a second preset position and a third preset position adjacent to the first preset position A6, which correspond to two black square areas adjacent to the position A6, are marked as the danger identification positions, which can be regarded as two grids adjacent to a grid A6 in the grid map in a Y axis direction, so that position distribution relationships among the first preset position, the adjacent second preset position and the adjacent third preset position, and the current position of the robot form the collision avoidance relationship, so as to limit the robot to continue to perform the sweeping work along the arcuate path toward the negative direction of the X axis, and accordingly, the robot is prevented from colliding with the charging base 5. Then, the robot stops moving forward, retreats for a segment of preset safety distance to the position A3 in a direction opposite to the current moving direction (corresponding to the direction pointed by the arrow P1 in FIG. 1), and then rotates in situ, so that the sensor directly in front of it faces the positive direction of the Y axis. As shown in FIG. 3, starting from the position A3, the robot starts to perform the sweeping work along the pre-planned arcuate path, and also starts to establish the safety area which is next (including a collision avoidance sensitive area 3 as shown in FIG. 3). Before the new safety area is established, the danger area is established by marking the danger identification position at a position that satisfies the collision avoidance relationship with the current position of the robot. The embodiment of marking the danger identification position provided in the present embodiment improves the identification coverage rate of the danger area, and reduces the risk of the robot colliding with the charging base on the front side.

As shown in FIG. 3, when the robot moves to the position A3, when the robot only detects the base avoidance signal on the left side of moving direction of itself, and detects that the preset working path extends toward the left side of the direction of the current moving path of the robot, as shown in FIG. 3, the robot moves, starting from the position A3, along the positive direction of the Y axis, and performs arcuate sweeping, that is, the preset working path. Since the charging base 5 is on the left side of the position A3, the base avoidance signal received by the robot at the position A3 comes from the charging base 5 on the right side (the negative direction of the X axis) of the position A3. At the same time, in the present embodiment, the currently planned arcuate path is set to extend toward the direction indicated by the arrow P on the right side, so that the area covered by the arcuate path is on the right side (the positive direction of the X axis) of the position A3. Compared with the arcuate path planned in the Embodiment 1, the currently planned arcuate path only has an opposite direction, so that the arcuate sweeping coverage area planned in the present embodiment is the same as that of Embodiment 1.

Before the robot starts to execute the arcuate sweeping, it is also necessary to determine a straight line where the current moving path of the robot is located or a body center line of the robot as a boundary, that is, to determine a straight line that passes through the position A3 and is perpendicular to the X axis as the boundary, then the boundary is recorded in the grid map, and thereafter, a right side area of the boundary is set to be the safety area and is recorded, so that the robot is not affected by the base avoidance signal during the process of moving in the safety area. In the present embodiment, a safety area for excluding the charging base is set according to a directional relationship between the base avoidance signal on the left side of the forward direction and the currently planned sweeping working path of the robot, so as to achieve the purpose of preventing the robot from being affected by the base avoidance signal of the charging base 5 during the sweeping process in this area.

Theoretically, the entire right side area of the boundary is the safety area. Considering that the charging base will be moved, or there is a charging base 1 (as shown in FIG. 3) in a further area on the right side, but the base avoidance signal sent by the charging base is not detected, therefore, it is necessary to establish a collision avoidance sensitive area for constraining the effective range of the safety area. A rectangular collision avoidance sensitive area whose length and width are both a preset sensitive distance is set, which can be determined according to the base avoidance signal range of the base, and the preset sensitive distance is less than or equal to the distance covered by the base avoidance signal. In the present embodiment, with the current position of the robot as a starting point, and according to the working direction of the preset working path, a collision avoidance sensitive area whose length and width are both the preset sensitive distance is established, and is recorded in the grid map. As shown in FIG. 3, in the present embodiment, a rectangular collision avoidance sensitive area whose length and width are both 2 m is preferably set, and the coordinate unit is set to be m; in the coordinate system corresponding to the grid map, which can be a local grid coordinate system, or a transformed global coordinate system, the coordinates of the current position A3 of the robot are (x0, y0), the length and width of the collision avoidance sensitive area are both 2 m, the extension direction of a node on the boundary of the collision avoidance sensitive area relative to the starting point is taken as the working direction, and the direction of the arrow P1 in FIG. 3 is taken as the working direction in the present embodiment, therefore four boundaries forming the collision avoidance sensitive area 3 in FIG. 3 respectively intersect at (x0+2, y0+2), (x0, y0+2), A3 (x0+2, y0) and A2 (x0, y0). Starting from the position A3 (x0, y0), the robot performs the sweeping work along the arcuate path shown in the figure, and does not process the base avoidance signal received in the collision avoidance sensitive area 3, but always moves to the position A2 (x0+2, y0) along the arcuate path shown in the figure, and then steps out of the collision avoidance sensitive area 3. The robot can move to the position A0 in the Embodiment 1. The first preset position, the second preset position and the third preset position are marked as the danger identification positions according to the method in the Embodiment 1, so that these identification positions and the current position A2 of the robot conform to the collision avoidance relationship, which is used for limiting the robot to continue to perform the sweeping work toward the working direction of the preset working path.

Embodiment 4: on the basis of the Embodiment 3, the robot moves to the position A5 along the pre-planned arcuate path that extends toward the negative direction of the X axis, and has already detected, at the position A5, the base avoidance signal transmitted from the charging base 5 directly in front of it. The danger identification position is marked at the first preset position A6 that is one body radius of the robot away from the current position of the robot, and at the same time, the danger identification positions are marked at a second preset position and a third preset position, which pass through the first preset position A6, are perpendicular to the current moving direction (corresponding to the direction in which A5 points to A6 in FIG. 4) of the robot, adjacent to the first preset position A6, and correspond to two black square areas adjacent to the position A6. At this time, the transmitting direction of the base avoidance signal received by the robot is the same as the working direction of the preset working path of the robot, so the safety area cannot be established at the position A5.

Figure 4:
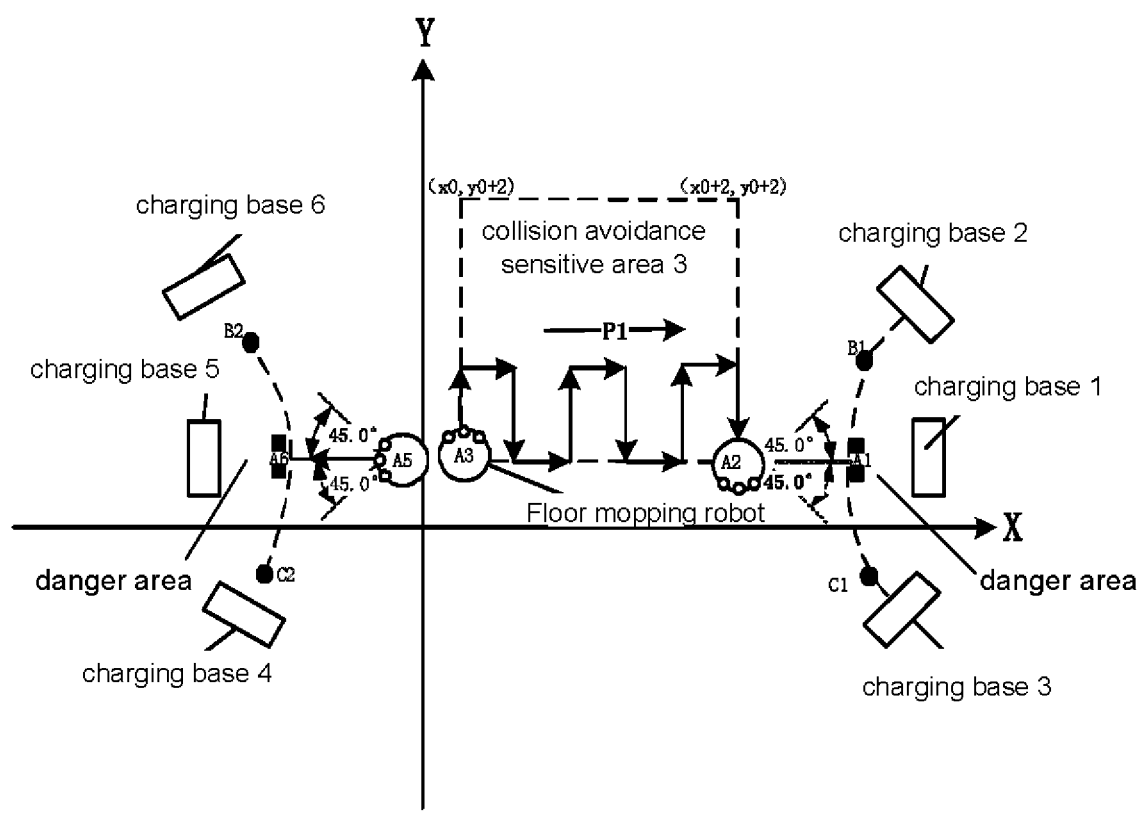
FIG. 4 is a process schematic diagram of establishing a safety area and a danger area during a movement process of a robot along a currently planned arcuate path in Embodiment 4, in a scene where there are charging bases on both a right side and a left side of a Y axis.

As shown in FIG. 4, before the safety area which is next is established, the robot detects, at the position A5, the base avoidance signal transmitted from a charging base 6 on the right side of its moving direction, but the situation is not excluded that the base avoidance signals are sent by the charging bases at other positions in the current working area, and that the signal intensities of the base avoidance signals are sufficient to be received by the right side sensor of the robot at the position A5; and then, in a direction of deflecting rightward for a preset angle relative to the current moving direction, that is, in a direction of deflecting rightward for 45 degrees relative to the direction in which A5 points to A6 in FIG. 4, the danger identification position is marked at a position B2 that is one body diameter of the robot away from the current position A5 of the robot, so that the danger identification position B2 and the current position A5 of the robot conform to the collision avoidance relationship. Accordingly, the robot is limited to work along the arcuate path toward the negative direction of the X axis, so as to avoid colliding with the charging base 6.

As shown in FIG. 4, before the safety area which is next is established, the robot detects, at the position A5, the base avoidance signal transmitted from a charging base 4 on the left side of its moving direction, but the situation is not excluded that the base avoidance signals are sent by the charging bases at other positions in the current working area, and that the signal intensities of the base avoidance signals are sufficient to be received by the left side sensor of the robot at the position A5; and then, in a direction of deflecting leftward for a preset angle relative to the current moving direction, that is, in a direction of deflecting leftward for 45 degrees relative to the direction in which A5 points to A6 in FIG. 4, the danger identification position is marked at a position C2 that is one body diameter of the robot away from the current position A5 of the robot, so that the identification position C2 and the current position A0 of the robot conform to the collision avoidance relationship. Accordingly, the robot is limited to work along the ' ㄱ '-shaped path toward the negative direction of the X axis, so as to avoid colliding with the charging base 4.

As shown in FIG. 4, after the danger identification positions B2, A6, C2 and the two black square areas adjacent to the position A6 are marked and mapped into the grid map, these identification positions are connected together, as shown by arc-shaped dotted lines in the negative direction of the X axis in FIG. 4, and the danger area is established synchronously in the grid map, so as to form boundaries for isolating the charging base 4, the charging base 5 and the charging base 6 from the robot. Then, the robot stops moving forward, and retreats for a segment of preset safety distance to the position A3 in a direction opposite to the current moving direction (corresponding to the direction pointed by the arrow P1 in FIG. 4), and then rotates in situ, so that the sensor directly in front of it faces the positive direction of the Y axis. The collision avoidance sensitive area 3 is established according to the method in Embodiment 3, and the robot moves in the collision avoidance sensitive area 3 according to the arcuate path planned in Embodiment 3, so as to perform the sweeping work. Starting from the position A3 (x0, y0), the robot performs the sweeping work along the arcuate path shown in the figure, and does not process the base avoidance signal received in the collision avoidance sensitive area 3, but always moves to the position A2 (x0+2, y0) along the arcuate path shown in the figure, and then steps out of the collision avoidance sensitive area 3. The robot can move to the position A0 in the Embodiment 1. The first preset position, the second preset position and the third preset position are marked as the danger identification positions according to the method in the Embodiment 1, so that these identification positions and the current position A2 of the robot conform to the collision avoidance relationship, which is used for limiting the robot to continue to perform the sweeping work toward the working direction of the preset working path. At the same time, the danger identification positions B1, A1, C1 are marked according to the method in Embodiment 2, and are mapped into the grid, and these identification positions are connected together, as shown by arc-shaped dotted lines in the positive direction of the X axis in FIG. 4. The danger area is established synchronously in the grid map to surround the charging bases, so as to form boundaries for isolating the charging base 1, the charging base 2 and the charging base 3 from the robot. In combination with the arc-shaped dotted lines in the negative direction of the X axis in FIG. 4, the positions of the charging bases in the grid map can be predicted, and the grid map is established by marking the position information in real time during the process of moving in the current working area by the robot. During the process of moving in the current working area by the robot, these surrounded semi-enclosed danger areas are abandoned at first, thereby reducing the risk of the robot colliding with the charging base; and the situation is avoided when the robot enters the danger area, it may repeatedly enter and exit the coverage area of the base avoidance signal and the coverage area of the guidance signals to return to the charging base, resulting in a decrease in the working efficiency of the robot. It should be noted that in the present embodiment, only stepping out of the collision avoidance sensitive area, the safety area which is next can be established by deleting the historical information of the safety area which is currently established, and the danger area also needs to be identified before the safety area is established, thereby avoiding the risk of the robot colliding with the charging base more effectively. Therefore, the robot is not affected by the base avoidance signal.

As one embodiment, before the safety area is established, the robot moves to a preset working position along the pre-planned arcuate path, the robot has already detected, at the preset working position, the base avoidance signal on the right side of its moving direction, and meanwhile detects the base avoidance signal on the left side of its moving direction, so that it can be determined that the base avoidance signal transmitted from the charging base exists directly in front of the moving direction of the robot. The danger identification positions are respectively marked at the first preset position and its adjacent second preset position and third preset position according to the method in the foregoing embodiment, so that position distribution relationships among the first preset position, the adjacent second preset position and third preset position, and the current position of the robot form the collision avoidance relationship, so as to prevent the robot from colliding with the charging base. Then, the robot stops moving forward, retreats for a segment of preset safety distance in a direction opposite to the current moving direction, and then rotates in situ to continue to perform the sweeping work along the pre-planned arcuate path (it can also be different from the original pre-planned arcuate path, so as to sweep and cover a new area), and meanwhile, the safety area which is next is established according to the method in the foregoing embodiment.

In the foregoing embodiment, after the danger area is established in the grid map for a first time, the robot moves to a non-safety area in the current working area; when the base avoidance signal is detected, it is determined whether a duration of the base avoidance signal reaches a preset response time, if the duration of the base avoidance signal reaches the preset response time, the method for marking the danger identification position in the foregoing embodiment is repeated to establish the next danger area, and if the duration of the base avoidance signal doesn't reach the preset response time, the base avoidance signal which is currently detected is not used to establish the danger area; and the danger identification positions are mapped into the grid map, and these identification positions are connected together to synchronously establish the danger area in the grid map, so as to surround the charging base. During the process of moving in the current working area by the robot, these surrounded danger areas are abandoned at first, so as to reduce the risk of the robot colliding with the charging base, and to avoid the situation that when the robot enters the danger area, it may repeatedly enter and exit the coverage area of the base avoidance signal and the coverage area of the guidance signals to return to the charging base, resulting in a decrease in the working efficiency of the robot. The preset response time is at a millisecond level. The accuracy of identification is improved, thereby improving the positioning accuracy of the charging base.

In the foregoing embodiment, the preset angle for determining the danger identification position is set between 30 and 60 degrees. On the basis of the assembly features of a collision avoidance sensor of the robot, the coverage of the identification area of the danger area is improved.

Finally, it should be noted that the above embodiments are only used for illustrating the technical solutions of the disclosure, rather than limiting the same. Although the disclosure has been described in detail with reference to preferred embodiments, those of ordinary skill in the art to which the disclosure belongs should understand, specific embodiments of the disclosure can still be modified or some technical features can be equivalently replaced. Without departing from the spirit of the technical solutions of the disclosure, these modifications and equivalent replacements should all be included in the scope of the technical solutions claimed in the disclosure.

What is claimed is:

1. A method for preventing a robot from colliding with a charging base, comprising:
    step 1, during a process of moving in a current working area of the robot, detecting, in real time, a reception condition of a base avoidance signal of the robot within a received signal coverage range thereof, wherein the base avoidance signal is from the charging base that is specifically used for charging the robot; and
    step 2, establishing a safety area in the current working area according to a direction feature relationship between the base avoidance signal received by the robot and a preset working path of the robot,
    wherein before establishing the safety area, according to an orientation relationship between the base avoidance signal received by the robot and a direction of a current moving path of the robot, marking and establishing a danger area at positions that satisfy a collision avoidance relationship with a current position of the robot, so that the robot avoids the charging base during the process of moving in the current working area,
    wherein before establishing the safety area:
    when the robot detects the base avoidance signal directly in front of it, marking a danger identification position at a first preset position that is one body radius of the robot away from the current position of the robot in a current moving direction of the robot, and meanwhile, in a direction perpendicular to the current moving direction of the robot, marking danger identification positions at a second preset position and a third preset position, which are adjacent to the first preset position, so that the first preset position, the second preset position and third preset position which are adjacent to the first preset position all conform to the collision avoidance relationship with the current position of the robot; and then, controlling the robot to stop moving forward, to retreat for a segment of preset safety distance in a direction opposite to the current moving direction, then to rotate in situ so as to continue to move along a path that has been passed through,
    when the robot only detects the base avoidance signal on the left side of the moving direction of itself, in a direction of deflecting leftward for a preset angle relative to the current moving direction, marking a danger identification position at a position that is one body diameter of the robot away from the current position of the robot, so that the danger identification position and the current position of the robot conform to the collision avoidance relationship; and then, controlling the robot to stop moving forward, to retreat for a segment of a preset safety distance in the direction opposite to the current moving direction, then to rotate in situ so as to move along a direction opposite to the preset working path, and when the robot only detects the base avoidance signal on the right side of the moving direction of itself, in a direction of deflecting rightward for a preset angle relative to the current moving direction, marking a danger identification position at a position that is one body diameter of the robot away from the current position of the robot, so that the identification position and the current position of the robot conform to the collision avoidance relationship; and then, controlling the robot to stop moving forward, to retreat for a segment of preset safety distance in the direction opposite to the current moving direction, then to rotate in situ so as to move along a direction opposite to the preset working path, wherein in the step 2:

when the robot only detects the base avoidance signal on a left side of the current moving direction, and detects that the preset working path extends toward a right side of the direction of the current moving path of the robot, determining a straight line where the current moving path of the robot is located or a body center line of the robot as a boundary, and setting a right side area of the boundary as the safety area, and when the robot only detects the base avoidance signal on a right side of the current moving direction, and detects that the preset working path extends toward a left side of the direction of the current moving path of the robot, determining a straight line where the current moving path of the robot is located or a body center line of the robot as a boundary, and setting a left side area of the boundary as the safety area, wherein the safety area is based on: with the current position of the robot as a starting point, establishing a collision avoidance sensitive area having dimensions that include a preset sensitive distance according to a working direction of the preset working path, wherein the preset sensitive distance is less than or equal to a distance covered by the base avoidance signal.

2. The method for preventing the robot from colliding with the charging base according to claim 1, wherein the safety area is: with the current position of the robot as a starting point, establishing a collision avoidance sensitive area whose length and width are both the preset sensitive distance according to the working direction of the preset working path, wherein the preset sensitive distance is less than or equal to a distance covered by the base avoidance signal, and an extension direction of a node on a boundary of the collision avoidance sensitive area relative to the starting point is taken as a working condition; and when the robot steps out of a current collision avoidance sensitive area along the preset working path, deleting the safety area currently established, and then, with a real-time position of the robot as the starting point, repeating the step 2 to establish the safety area which is next, wherein before establishing the safety area which is next, establishing the danger area by marking danger identification positions at the positions that satisfy the collision avoidance relationship with the current position of the robot, wherein, after the collision avoidance sensitive area is established, recording the collision avoidance sensitive area into a grid map.

3. The method for preventing the robot from colliding with the charging base according to claim 2, further comprising mapping the danger identification positions into the grid map, and then the danger identification positions are connected together to synchronously establish the danger area in the grid map; and the grid map is established by marking position information in real time during the process of moving in the current working area by the robot.

4. The method for preventing the robot from colliding with the charging base according to claim 1, wherein the preset angle is between 30 and 60 degrees.

5. The method for preventing the robot from colliding with the charging base according to claim 3, further comprising: after establishing the danger area in the grid map for a first time, controlling the robot to move to a non-safety area in the current working area; and when the base avoidance signal is detected, determining whether a duration of the base avoidance signal reaches a preset response time, if the duration of the base avoidance signal reaches the preset response time, repeating the step 2 to establish the danger area which is next, and if the duration of the base avoidance signal does not reach the preset response time, not using the base avoidance signal which is currently detected to establish the danger area, wherein the preset response time is at a millisecond level.

6. The method for preventing the robot from colliding with the charging base according to claim 1, wherein before establishing the safety area, when the robot only detects the base avoidance signal on the left side of the moving direction of itself, in a direction of deflecting leftward for the preset angle relative to the current moving direction, marking a danger identification position at a position that is one body diameter of the robot away from the current position of the robot, so that the identification position and the current position of the robot conform to the collision avoidance relationship; and then, controlling the robot to stop moving forward, to retreat for a segment of the preset safety distance in the direction opposite to the current moving direction, then to rotate in situ so as to move along a direction opposite to the preset working path.

7. The method for preventing the robot from colliding with the charging base according to claim 1, wherein before establishing the safety area, when the robot only detects the base avoidance signal on the right side of the moving direction of itself, in a direction of deflecting rightward for the preset angle relative to the current moving direction, marking a danger identification position at a position that is one body diameter of the robot away from the current position of the robot, so that the identification position and the current position of the robot conform to the collision avoidance relationship; and then, controlling the robot to stop moving forward, to retreat for a segment of the preset safety distance in the direction opposite to the current moving direction, then to rotate in situ so as to move along a direction opposite to the preset working path.

8. The method for preventing the robot from colliding with the charging base according to claim 1, wherein the safety area is: with the current position of the robot as a starting point, establishing a collision avoidance sensitive area whose length and width are both a preset sensitive distance according to the working direction of the preset working path, wherein the preset sensitive distance is less than or equal to a distance covered by the base avoidance signal, and an extension direction of a node on a boundary of the collision avoidance sensitive area relative to the starting point is taken as a working condition; and when the robot steps out of a current collision avoidance sensitive area along the preset working path, deleting the safety area currently established, and then, with a real-time position of the robot as the starting point, repeating the step 2 to establish the safety area which is next, wherein before establishing the safety area which is next, establishing the danger area by marking danger identification positions at the position that satisfies the collision avoidance relationship with the current position of the robot.

* * * * *